United States Patent [19]

Swensson

[11] 4,455,945
[45] Jun. 26, 1984

[54] AIR BEARING POWER AND TRACTION DRIVE SYSTEM

[75] Inventor: Malte Swensson, North Hollywood, Calif.

[73] Assignee: Airail Systems, Inc., Woodland Hills, Calif.

[21] Appl. No.: 394,900

[22] Filed: Jul. 6, 1982

[51] Int. Cl.³ .............................................. B61B 13/08
[52] U.S. Cl. ................................. 104/23 FS; 104/134; 180/125
[58] Field of Search ................. 104/23 FS, 23 R, 134, 104/89, 246, 245, 284, 281, 155, 161; 180/125, 129; 92/DIG. 1, DIG. 2; 308/DIG. 1; 277/15, 28

[56] References Cited

U.S. PATENT DOCUMENTS

| | | | |
|---|---|---|---|
| 3,595,171 | 7/1971 | Sheppard | 104/23 FS |
| 3,648,799 | 3/1972 | Young et al. | 104/23 FS |
| 3,678,860 | 7/1972 | Van Veldhuizen | 104/23 FS |
| 3,937,149 | 2/1976 | Winkle et al. | 104/281 |
| 3,985,081 | 10/1976 | Sullivan | 104/23 FS |
| 4,273,031 | 6/1981 | Hannon | 104/161 |

Primary Examiner—Randolph Reese
Assistant Examiner—Donald Hajec

[57] ABSTRACT

This invention is a combination consisting of a mechanism for supporting varying loads by use of compressed air in motion and transported by a set of traction wheels acting equal and opposite to the compressed air force while transporting the load. The unique features of this invention incorporate the capability of transporting varying loads at various speeds with a considerable reduction of horsepower requirements. In accomplishing this transportation of loads there is created an Air Motive Clamp upon the guiding support member (track or beam) which instantaneously and continuously guides the transported loads automatically by a closed loop servo system thereby simplifying operational control, reducing the external supporting weights required and provides substantial economic savings including:

(1) Due to the compressed air support of loads there is a substantial reduction in friction as compared with present day bearing load support.

(2) By placing tractive forces only upon the wheels, the size and weight of the wheels is reduced by approximately 80 percent.

(3) The structural support transportation system is reduced proportionately to the reduction of the weight savings derived.

Included in this system is provided load carrying emergency pads (for when no compressed air is available) that permit the loaded vehicle to operate at a decreased speed to a point of repair or load relief.

6 Claims, 7 Drawing Figures

AIR BEARING POWER AND TRACTION DRIVE SYSTEM

This invention is a unique Air-Bearing Power and Traction Drive System for use in a lowspeed to highspeed, low or high load, elevated or surface monorail (or multirail) transportation vehicle design. This invention has many other industrial applications. It provides for transportation of varying types of loads at substantially lower costs than present transportation mediums. For example, a passenger train of 80 passengers per train car only requires per train car slightly more horsepower than a large automobile. Proportionate performance can be expected from varying sizes of vehicles or loads.

This device is a specially designed truck to be used in a load carrying capacity in conjunction with a traversing surface, a prime mover, and a compressed air source. The combination of these functions is operated and automatically controlled through an electronic closed loop servo system which controls the traction clamping and driving force, the load carrying force, and control of an operating air bearing space between the traversing surface and the airbearing truck.

The air bearing truck encompasses a right and left hand side each with separate and identical load lifting functions, high pressure-low displacement air plenum chambers defined as an upper plenum chamber, two or more air distribution cylinders, and a lower plenum chamber incorporating a floating high pressure seal, and pneumatic wheels for stabilization, traction, and control of compressed air leakage rate.

In this model, each truck is capable of lifting 22,500 pounds and greater per truck for truck weights of 150 to 250 pounds, and is capable of travel at speeds from slightly moving to in excess of 200 m.p.h.

The truck is adaptable to various power sources including standard motor drive for electric, fuel driven motors, or linear induction motor drive thereby permitting transport of loads over steep grades of 20% and greater.

The upper plenum chamber is the container for incoming high pressure air supplied to the truck.

The cylinders, comprising cylindrical bores, are the passageway through which compressed air is distributed into the lower plenum chamber, and the area within which the cylinder sleeves function.

The cylinder sleeves are an auxiliary emergency high pressure seal providing lifting functions for a substantial proportion of the load and may be increased to 100% of the load capacity by an increase in air pressure. The cylinder sleeves are air pressure-activated to block excess air leakage in the event of a damaged or broken high pressure seal and to act as an alternate floating emergency high pressure seal.

A cylinder sleeve function is to reduce the air leakage rate from the lower plenum chamber when the pressure drops significantly below the pressure of the upper plenum chamber. The effect is to stop excessive air leakage from affecting other parts of the truck and other trucks of the load carrying system in the event of a defective or damaged high pressure seal.

The cylinder sleeve normally functions with the bottom of the sleeve against the top of the lower plenum chamber. The sleeve will continue to function in this position so long as air pressures in the upper and lower plenum chambers are relatively equal. A reduction of the pressure in the lower plenum chamber at a given point of pressure different will cause the emergency seal sleeves to automatically drop to the traversing surface and act as a seal. The moment at which the sleeve will drop is determined by the force created from the surface area at the top of the sleeve as compared with the force created at the bottom face of the sleeve. For the sleeve to return to normal operating position the force created on the bottom of the sleeve area as compared with the force created on the top of the sleeve area must be greater. The sleeve is provided with an inside bevel face on the bottom with sufficient surface area to cause an upward movement of the sleeve upon adequate operating pressure.

Within the lower plenum chamber there are air pressure and proximity sensors operating in a closed loop servo system supplying signals to a compressed air flow meter control for monitoring the air bearing functions.

The high pressure floating seal is located around the bottom rectangular periphery of the body of the lower plenum chamber. The high pressure floating seal function is to control leakage rate of the high pressure air with only sufficient air being released to eliminate or reduce friction, wear, and heat between the bottom portion of the high pressure seal and the traversing surface, this permits the use of lower power requirements and extended seal life. Within the high pressure seal are one or more temperature sensors to detect excessive temperatures within the seal to avoid heat damage and deterioration of the seal.

For emergency conditions in the event of total loss of air supply, bearing pads are provided to keep the air cushion-supported truck from damaging the traversing surface or the truck, permitting the truck load to be supported at reduced travel speed on the bearing pads.

Below the traversing surface are two or four traction or stabilizing pneumatic tired wheels. The air pressure in the tire will be varied to be commensurate with the load capacity. The function of the wheels is to supply a traction and stabilizing mechanism for automatically counteracting the lifting forces of the compressed air induced by the air pressure from the plenum chambers on top of the traversing surface, and providing a controllable clamping action during movement for varying travel conditions and changing elevations. The wheels also counteract the lift induced by aero dynamic forces upon a transporting vehicle; acceleration forces induced by deviations in a traversing structure; centrifugal forces induced by turning and banking of the vehicle; and eccentric loads caused by load distribution. The wheels also provide a dampening effect on the aforementioned forces imposed.

The pneumatic tired wheel assembly provides traction and stabilizing functions in the standard motor drive used in electric or fuel driven motors. When a linear induction motor drive is used, the pneumatic tired wheel assembly provides only stabilizing functions.

The object of this invention is several fold, including:
1. The decrease in horsepower requirements typical for conventional transportation systems by:
   a. Eliminating the load bearing functions from the driving wheels (excepting the force required for traction).
   b. Decreasing the size and weight of truck assembly by reducing frictional forces.
   c. Reduction in total dead weight of the entire transportation system.
2. The conservation of energy.

3. The reduction of noise pollution.
4. The reduction of ground vibration effects.
5. The reduction in operation and maintenance costs.
6. The reduction of overall transportation construction costs.
7. The reduction in operating costs per ton mile.
8. The realization of high speed transportation safety.

The invention is more particularly described with reference to the attached drawings herein:

Figure 1:
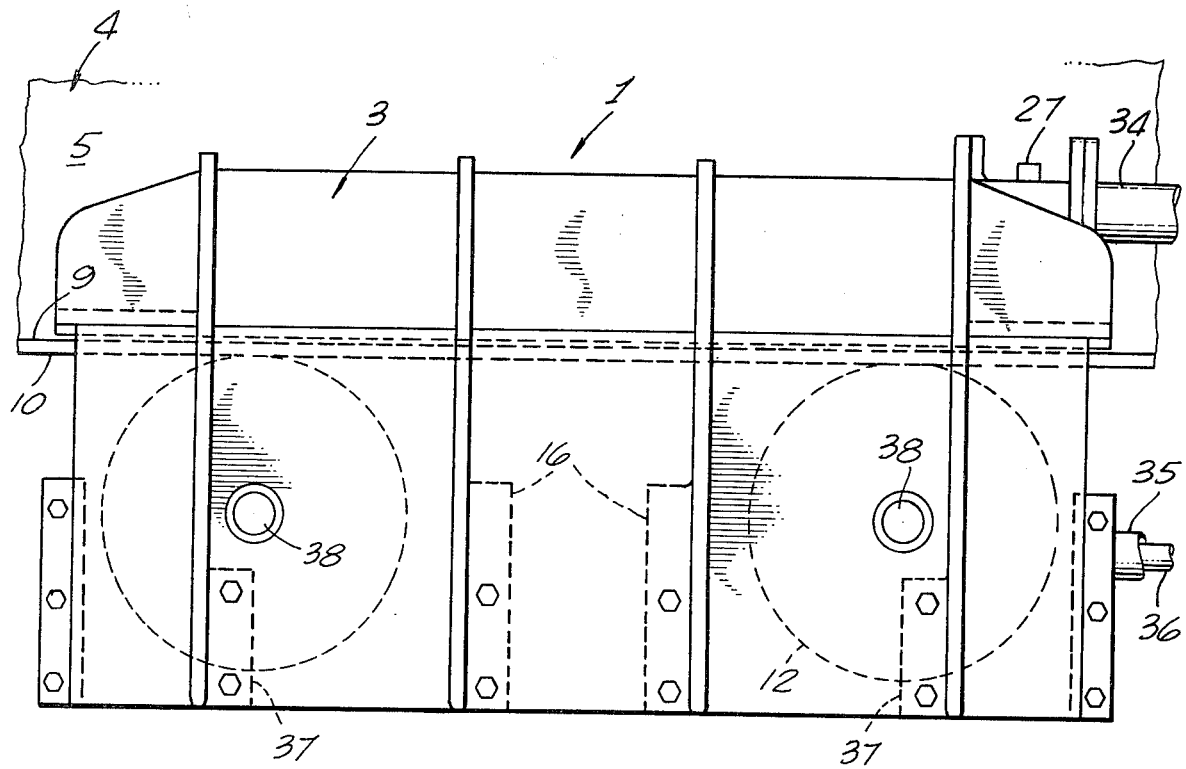
FIG. 1 is a longitudinal side view of the exterior of the air bearing load truck complete assembly as it would appear incorporating all the separate components described in this invention as mounted on a traversing support member.
Figure 2:
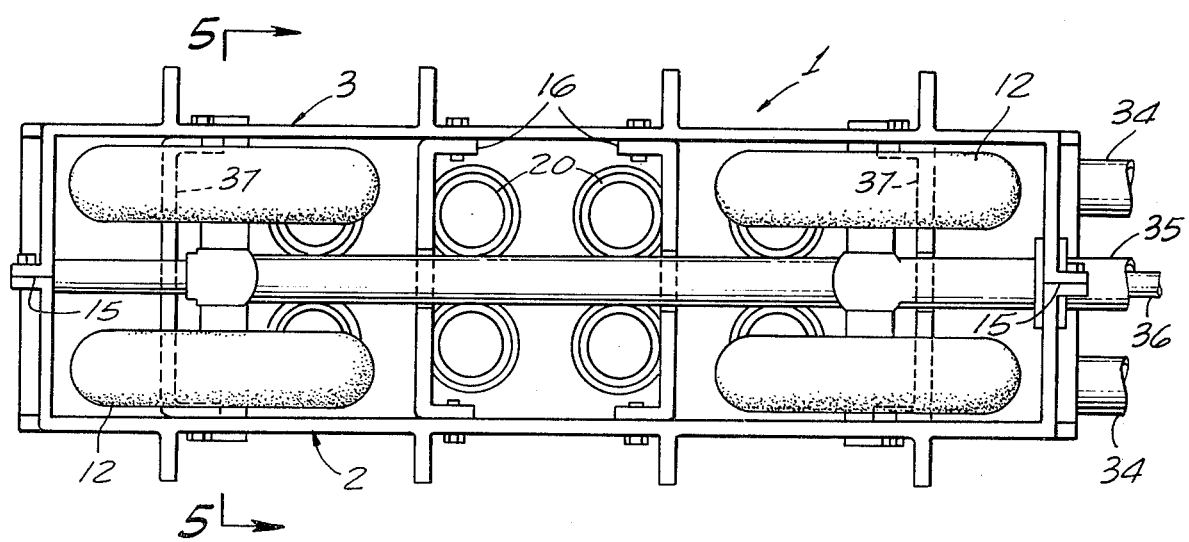
FIG. 2 is a longitudinal bottom view of the exterior of the air bearing truck complete assembly with the traversing support member and the high pressure seals excluded.
Figure 3:
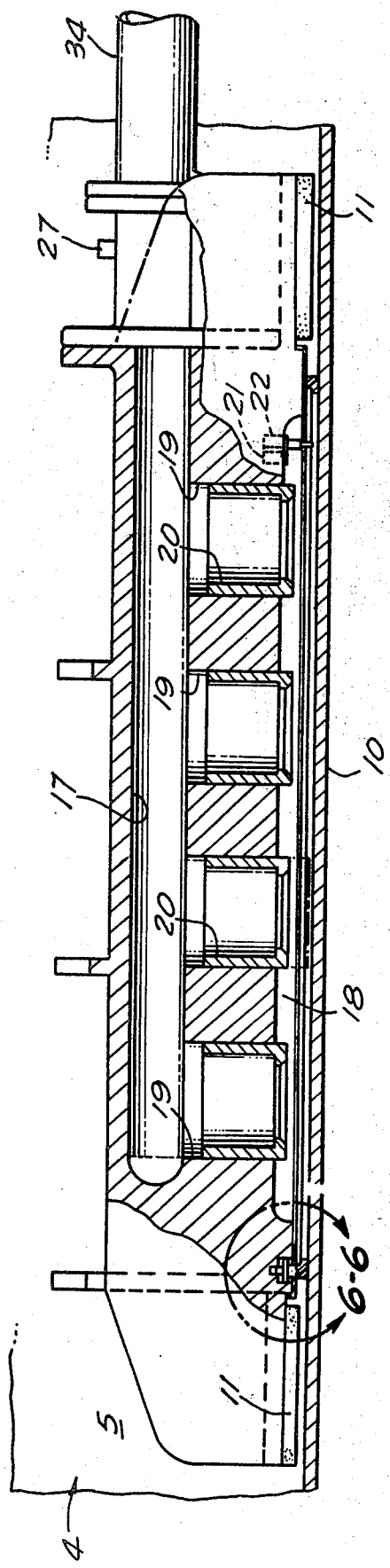
FIG. 3 is a fragmentary longitudinal sectional view of the upper portion of the air bearing truck assembly located above the traversing support member taken substantially along line 3—3 of FIG. 4.
Figure 4:
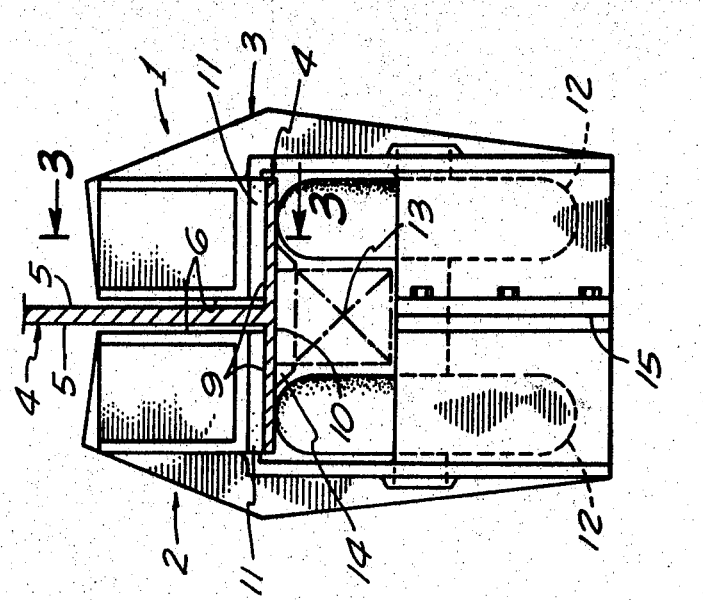
FIG. 4 is an exterior end view of the air bearing truck complete assembly shown in FIG. 1.
Figure 5:
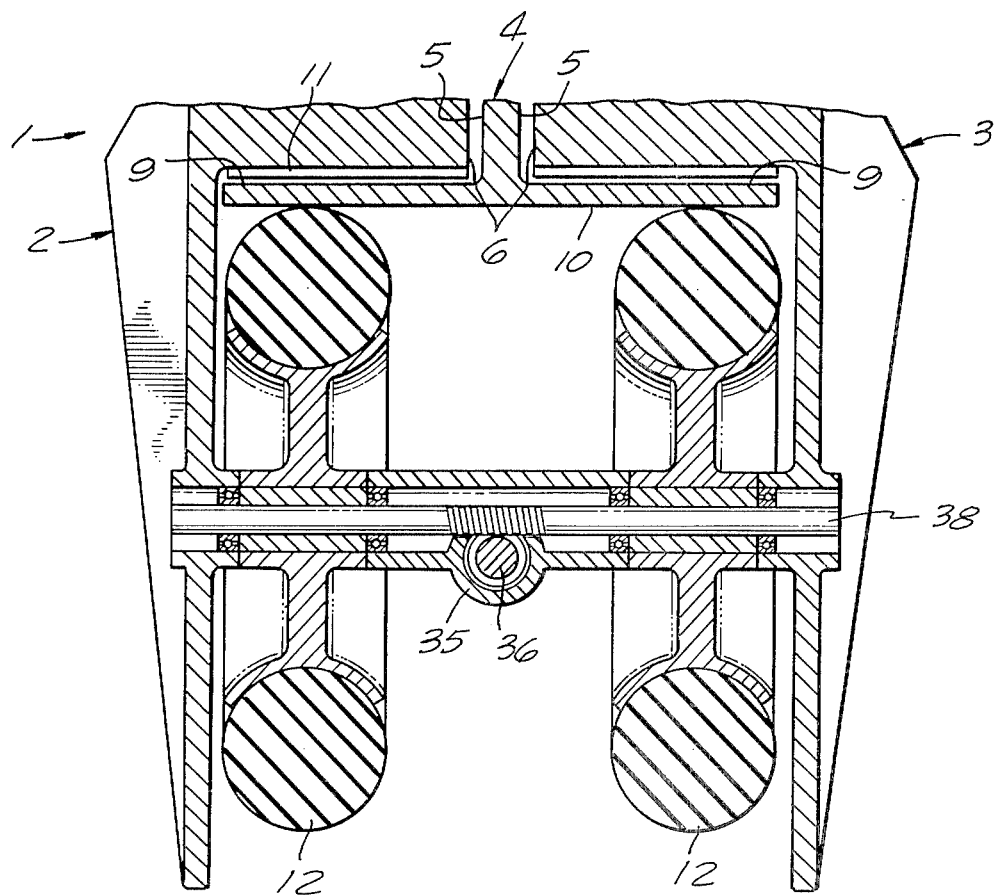
FIG. 5 is a fragmentary vertical sectional view taken essentially along line 5—5 of FIG. 2 with the upper portion of the air bearing truck assembly cut off.
Figure 6:
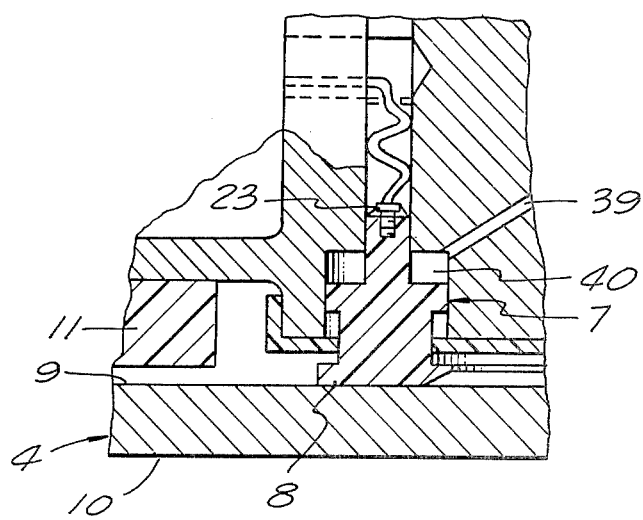
FIG. 6 is a fragmentary vertical sectional view of the air bearing truck assembly essentially within the encircled area 6—6 of FIG. 3 showing a detailed enlargement of the high pressure seal and surrounding high pressure seal supporting channel.
Figure 7:
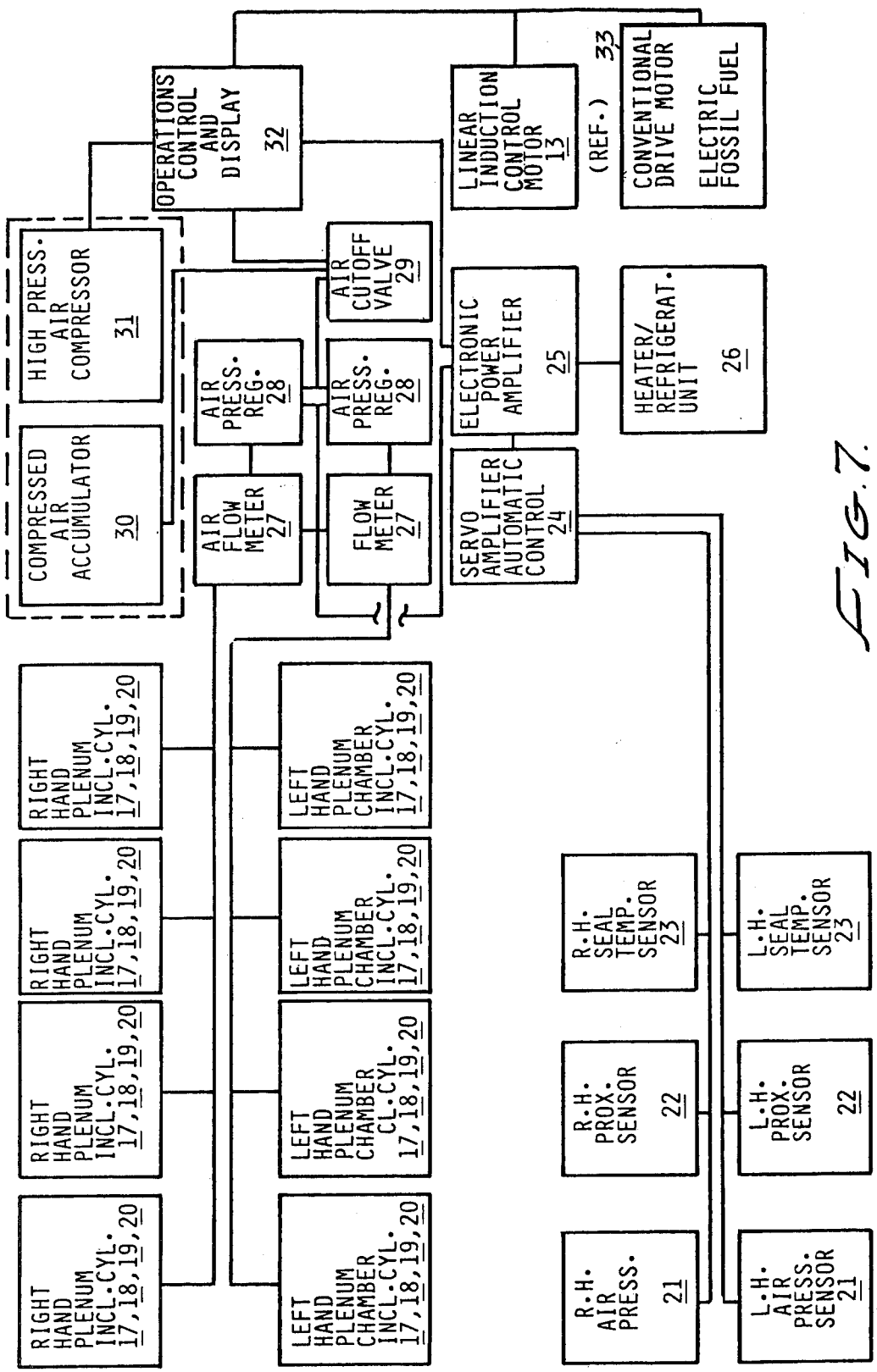
FIG. 7 is a schematic diagram of the complete mechanical assembly and electronic servo system showing the elements in the automated servo loop system and the air and electric power source control elements.

Referring to the drawings, 1 generally designates the air bearing load truck complete assembly; 2 and 3 generally designate the two symmetrically designed halves of the truck body 1 as supported by the traversing support member, which in this configuration, is a structural Tee beam 4, showing the division of the upper part of the truck body 1 with the two vertical Tee beam faces 5 standing clear of the upper portion of the truck body faces 6 and the high pressure compressed air seal 7 and its bottom face 8 positioned in a high pressure seal channel 40 facing the two horizontal Tee beam upper traversing surfaces 9 of the traversing support member 4, upon which the emergency load pads 11 rest. High pressure air is provided to the high pressure seal channel 40 from the lower plenum chamber 18 through one or more high pressure air ports 39.

The Tee beam lower traction surface 10 of the traversing support member 4 provides a stable surface against which the two stability and traction pneumatic tire and wheel assemblies 12 with their supporting axles 38 are positioned vertically and centered by the guiding members 14 attached to the lower traction surface 10 of the traversing support member 4.

The linear induction motor 13 as depicted by the blocked out section between the guiding members 14 positioned in intimate contact with the lower traction surface 10 of the traversing support member 4 is shown as one of the alternate tractive functions (for reference only).

The power for the two stability and traction pneumatic tire and wheel assemblies 12 is supplied through a drive shaft 36 which is encased in a drive shaft housing 35 and supplied by a conventional drive motor 33.

The vertical joining faces 15 of the lower portion of the truck body halves 2 and 3 are bolted together to support the component parts and forces imposed upon them and thereby preventing the truck assembly 1 from "jumping track". Truck body center braces 16 and truck body outer braces 37 are cross body support braces for the lower portion of the two truck halves 2 and 3 positioned along the longitudinal length of the truck assembly 1.

The upper plenum chamber 17 and lower plenum chamber 18 on the right truck body half 2 is a mirror image of the upper plenum chamber 17 and lower plenum chamber 18 on the left truck body half 3, each with one or more high pressure air transfer cylinders 19 for distributing compressed air from the upper plenum chamber 17 to the lower plenum chamber 18, and provides a high pressure seal 7 with continuous intimate proximity over its full periphery with the Tee beam traversing surface 9 for adjusting to any vertical variations or undulations of the upper traversing surfaces 9. Within each high pressure air transfer cylinder 19 is positioned an emergency pressure seal sleeve 20 which is activated in the event of a broken or damaged high pressure compressed air seal 7.

Within the lower plenum chamber 18 are located one or more air pressure sensors 21 and one or more proximity sensors 22 operating in a closed loop servo system, servo amplifier automatic control 24 and electronic power amplifier 25, supplying command signals to a compressed air flow meter control 27 and compressed air pressure regulator 28 for monitoring the air bearing functions.

The assembled truck halves 2 and 3, in conjunction with their component parts, including the pressure seals 7 and the pneumatic tire and wheel assembly 12, when supplied with high pressured air, form an Air Motive Clamp upon the traversing support member 4 thereby inducing a controlled attitude of the truck with respect to the traversing surface while in motion, including acceleration and deceleration.

The assembled truck halves 2 and 3 in conjunction with their component parts, including the four low friction emergency load support pads 11, and the traction wheels 12 become a Motive Clamp when traversing on the traversing support member 4 in emergency situations where little or no compressed air is available. The Air Motive Clamp is usable in low and high speed operations and the Motive Clamp is used in low speed and emergency operations. The Motive Clamp also acts as a positive static clamp when stationary.

The four low friction support pads 11 on each side of each end of the truck halves 2 and 3 positioned just above the Tee beam 4 upper traversing surface 9, function as air bearing truck supports for emergency travel along the traversing surface Tee beam 4 when little or no air is available, thus the low friction support pads 11 in intimate contact with Tee beam 4 upper surfaces 9 and the traction wheels 12 in intimate contact with Tee beam 4 lower traction surface 10 forming a Motive Clamp on the upper traversing surface 9 and lower traction surface 10 of the traversing support member 4. The support pads 11 also serve as a support for the vehicle in the stationary position; as a seal deflection limiter due to irregularities of the traversing plane; as a deflector of extraneous rubble on the traversing plane; and as an emergency brake.

The stablizing and tractive pneumatic tire and wheel assembly 12 supported by axles 38 in mesh with the drive shaft 36 of each pair of pneumatic tire and wheel assembly axles 38 provide power transmission when the alternate mode of traction is applied to the drive shaft housing 35 and is provided with radial/thrust bearings at the drive shaft 36.

Referring to FIG. 8, the overall control system is shown consisting of operations control and display unit 32 and compressed air source including compressed air accumulator 30 and high pressure air compressor 31, each performing its separate function with the compressed air source 30 and 31 supplying compressed air through a compressed air intake 34 to a cut-off valve 29 to a pressure regulator 28 which in turn supplies compressed air to a flow meter 27, and the flow meter 27 supplies compressed air to an upper plenum chamber 17 from which the compressed air passes through the air transfer cylinders 19 into a lower plenum chamber 18 at a controlled release rate, with the compressed air being released under the high pressure seal 7, with the load being stabilized by a penumatic tire and wheel assembly 12. This function is monitored by one or more pressure sensors 21 and one or more proximity sensors 22. The electronic signals from these monitors are transmitted through a closed loop servo amplifier 24 which in turn transmits a correcting signal through a power amplifier 25 to one or any of the operation control monitor units, i.e., a heater/refrigeration unit 26, a compressed air flow meter 27, a compressed air pressure regulator 28, and a compressed air cut-off valve 29. The operations control and display 32 receives signals from a proximity sensor 22 and displays the route location of the load being carried.

The high pressure air seal 7 contains one or more temperature sensors 23 for monitoring the high pressure seal 7 temperature also operating in the closed loop servo system, servo amplifier automatic control 24 and electronic power amplifier 25 supplying command signals to a heater/refrigeration unit 26, compressed air flow meter 27, compressed air pressure regulator 28, and compressed air cut-off valve 29.

I claim:

1. A high pressure-low displacement air bearing truck for supporting a fully loaded vehicle for operation on a relatively flat traversing support member, and capable of automatically accommodating varying loads instantaneously and functioning in conjunction with power sources supplying required compressed air for load support, and traction including adaptive use of fossil fuel engines, electric motors, linear induction motors, and other power sources with each truck comprising:
   a. two plenum chamber systems each providing high pressure air to a traversing plane of the support member;
   b. a high pressure seal for each plenum chamber which enables control of a lifting force by a compressed air release rate from the plenum chamber;
   c. at least two wheels with pneumatic tires, axles and power drive shaft mounted in the lower portion of the truck which functions to:
      1. act as an equal and opposite force against a lower side of a traversing support member to that of the compressed air force on an upper side of the traversing support member;
      2. supply a stabilizing mechanism with an equal and opposite force for automatically counteracting:
         (a) the lifting forces induced by the compressed air in the plenum chamber against an upper traversing surface;
         (b) a lift induced by aero dynamic forces upon a transporting vehicle;
         (c) acceleration forces induced by deviations in a traversing structure;
         (d) a centrifugal force induced by turning and banking of a transporting vehicle;
         (e) eccentric loads caused by load distribution;
      3. Provide tractive forces against a lower traversing surface;
      4. provide a dampening effect on the aforementioned forces imposed;
   d. the several parts of the truck creating an Air Motive Clamp to the traversing support member thereby inducing a controlled attitude of the truck with respect to the traversing surface while in motion, including acceleration and deceleration, and a positive Motive Clamp for emergency travel speed, and a positive static clamp when stationary;
   e. truck operating control system providing a closed loop servo system for detecting system variations enabling instantaneous automatic controlled response to the functional elements, and comprising:
   A. functional elements including:
      (1) two pressure regulator units to provide a proper air pressure to the plenum chambers and high pressure air seals;
      (2) two air flow meter units to provide the proper flow of air into the plenum chambers and high pressure seals;
      (3) at least two temperature control units to maintain a proper seal temperature;
      (4) a servo amplifier to receive function variations from sensors and required correctional signals and to transmit corrective action to a proper control unit;
      (5) servo amplifier power supply to supply power for a corrective action of the other functional elements;
   B. operation monitoring elements including:
      (1) air pressure sensors in the plenum chambers to indicate the pressure within the chamber;
      (2) proximity sensors to indicate the vertical attitude of the air bearing truck with respect to the traversing plane;
      (3) heat sensors to indicate the temperature of the high pressure air bearing seal;
   f. four cylinders in each plenum chamber to provide distribution of the compressed air to the traversing plane;
   g. a sleeve is provided in each cylinder which is automatically located in a nonfunctioning position during normal operation, and functions during emergency conditions at which time it is driven automatically due to a pressure differential between upper and lower portions of the plenum chambers to the traversing plane and becomes an alternate floating seal;
   h. four support pads, two at each end of the truck assembly, which are utilized:
      (1) as a support for the vehicle in stationary position;
      (2) as a seal deflection limiter due to irregularities of the traversing plane;
      (3) as a low friction positive support for emergency travel when there is no compressed air available;

(4) as a deflector of extraneous rubble on the traversing plane;

(5) as an emergency brake.

2. The invention defined in claim 1 includes a high pressure-low displacement air bearing truck used in plurality to support a fully loaded vehicle to traverse on a relatively flat surface with automatically controlled air release rate between the high pressure seal and the traversing surface thereby resulting in reduced friction, reduced wear, reduced heat and permitting the use of lower power requirements, and extended seal life.

3. The invention defined in claim 1 includes a high pressure-low displacement air bearing truck used in plurality for supporting a fully loaded vehicle for traversing on a relatively flat traversing surface with a closed loop servo system providing constant signals and consisting of:

(A) high pressure compressed air sensors which determine the pressure in the lower plenum chamber which in turn transmits an electronic signal to the servo amplifier closing the loop with a correcting signal to the pressure regulator units;

(B) electronic proximity sensors which determine the effect on the seal by measuring the movement and location of the bottom of the air bearing truck with respect to the traversing surface, thereby causing a signal to be transmitted by the proximity sensors to the servo amplifier with an output signal from the servo amplifier closing the servo loop by transmitting the corrective signal when required to the compressed air flow meter;

(C) an electronic heat sensor located within the high pressure seal which measures the heat in the high pressure seal causing a signal to be transmitted to the servo amplifier, which closes the servo loop by sending a corrective signal when required to the proper corrective control units for adjusting the seal temperature to a proper temperature level, thereby automatically maintaining the air release rate between the high pressure seal and traversing surface by the corrective signal transmitted by the electronic proximity sensors detecting the variations in the traversed surface.

4. The invention defined in claim 1 includes a high pressure-low displacement air bearing truck to support a fully loaded vehicle for operating on a relatively flat traversing surface with a compressed air-motive clamp system which functions with a plurality of rubber tire wheels positioned on the lower portion of the truck which provide an equal and opposite force on the underside of the traversing member to that force created by the compressed air against the upper side of the traversing member, thereby providing a means for (1) a lifting force, traction, (2) braking, (3) stabilizing, (4) control of air release from under the seal, and (5) a compressed Air-Motive Clamp upon the traversing member independent of the load being transported; and, adaptive to fossil fuel, electric, linear induction motors, and other traction power means, thereby permitting transport of loads over steep grades of 20% and greater; further, said compressed Air-Motive Clamp system functions under high and low pressure compressed air.

5. The invention defined in claim 1 includes a high pressure-low displacement air bearing truck for supporting a fully loaded vehicle for traversing on a relatively flat traversing surface with a high pressure seal located around the bottom rectangular periphery of the body of the lower plenum chamber, with condensed air entering through a pressure port on the top and compressed air entering from the plenum chamber on the bottom and floating in the compressed air within the channel and bottom of the seal in its full periphery to accomodate the exterior vertical variations of the traversing surface.

6. The invention defined in claim 1 includes a high pressure-low displacement, air bearing truck which has a characteristic of providing a high frequency response essential to the operation of an automated control system to support a fully loaded vehicle for operating on a relatively flat traversing surface with an arrangement of cylindrical bores each containing a sleeve which acts as an emergency pressure seal when there is a loss of atleast part of the effectiveness of the high pressure seal causing atleast one of the emergency pressure sleeves to automatically drop from the lower portion of the plenum chamber to the traversing surface when a pressure differential is created by a reduced pressure in the lower plenum chamber relative to the upper plenum chamber.

* * * * *